United States Patent
Kobayashi (10) Patent No.: US 10,066,724 B2
(45) Date of Patent: Sep. 4, 2018

(54) STRAIN WAVE GEARING

(71) Applicant: Harmonic Drive Systems Inc., Shinagawa-ku, Tokyo (JP)

(72) Inventor: Masaru Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 229 days.

(21) Appl. No.: 15/101,179

(22) PCT Filed: Feb. 26, 2015

(86) PCT No.: PCT/JP2015/055685
§ 371 (c)(1),
(2) Date: Jun. 2, 2016

(87) PCT Pub. No.: WO2016/135933
PCT Pub. Date: Sep. 1, 2016

(65) Prior Publication Data
US 2017/0002914 A1    Jan. 5, 2017

(51) Int. Cl.
*F16H 35/00* (2006.01)
*F16H 49/00* (2006.01)
*F16H 55/17* (2006.01)

(52) U.S. Cl.
CPC ........... *F16H 49/001* (2013.01); *F16H 55/17* (2013.01); *F16H 2049/003* (2013.01)

(58) Field of Classification Search
CPC .................................................... F16H 49/001
(Continued)

(56) References Cited

U.S. PATENT DOCUMENTS 6,526,849 B1 *  3/2003  Ishikawa ............. F16H 55/0833
                                                74/457
7,328,632 B2 *  2/2008  Ishikawa ............. F16H 55/0833
                                                74/640
(Continued)

FOREIGN PATENT DOCUMENTS

JP    U-56-149159       11/1981
JP    2001-146945 A      5/2001
(Continued)

OTHER PUBLICATIONS

International Search Report (PCT/ISA/210) dated May 26, 2015, by the Japanese Patent Office as the International Searching Authority for International Application No. PCT/JP2015/055685.
(Continued)

*Primary Examiner* — Ha Dinh Ho
(74) *Attorney, Agent, or Firm* — Buchanan Ingersoll & Rooney PC (57) ABSTRACT

In a strain wave gearing, external teeth of a flexible externally toothed gear are elastically deformable in a direction in which the tooth thickness of the external teeth decreases. Engagement between internal teeth of a first and a second rigid internally toothed gears and the external teeth is set in an overlapping state in which the external teeth elastically deform and engage in a state in which no gap is present. The tooth profile of the internal teeth is a corrected tooth profile so that no interference occurs between a tooth top portion of the internal teeth and a dedendum portion of the external teeth when the teeth are engaged in the overlapping state. A strain wave gearing capable of minimizing or eliminating tooth engagement backlash is realized.

8 Claims, 5 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 8,661,939 | B2* | 3/2014 | Ishikawa | ............. F16H 55/0833 |
| | | | | 74/462 |
| 8,776,638 | B2* | 7/2014 | Ishikawa | ............. F16H 55/0833 |
| | | | | 74/640 |
| 9,829,071 | B2* | 11/2017 | Nakamura | ................ F16H 1/32 |
| 2011/0237382 | A1 | 9/2011 | Ishikawa | |
| 2012/0258835 | A1* | 10/2012 | Kataoka | .................. F16H 55/18 |
| | | | | 475/178 |

FOREIGN PATENT DOCUMENTS

| | | |
|---|---|---|
| JP | A-2012-219908 | 11/2012 |
| JP | A-2013-119919 | 6/2013 |
| WO | WO 2010/070712 A1 | 6/2010 |

OTHER PUBLICATIONS

Written Opinion (PCT/ISA/237) dated May 26, 2015, by the Japanese Patent Office as the International Searching Authority for International Application No. PCT/JP2015/055685.

* cited by examiner

STRAIN WAVE GEARING

TECHNICAL FIELD

The present invention relates to a strain wave gearing devoid of engagement backlash.

BACKGROUND ART

In a strain wave gearing, a flexible externally toothed gear is flexed to a non-circular shape, e.g., to an ellipsoidal shape by a wave generator, and caused to partially engage with a rigid internally toothed gear. If the engagement between the internally toothed gear and the externally toothed gear is such that the engagement PCDs of the two gears overlap (engage in an overlapping state), the teeth engagement interference causes, inter alia, a rapid increase in the startup torque and the tooth surface load, significantly degrading the performance of the strain wave gearing and making assembly of the gears difficult. Therefore, the gears in a strain wave gearing are designed to engage in an underlapped state, in which the engagement PCDs of the two gears are slightly apart from each other.

In this underlap design, as shall be apparent, gaps are produced between the teeth of the engaging gears in the vicinity of the long axis of the externally toothed gear flexed to an ellipsoidal shape, and the gaps appear as teeth backlash. In a cup-profile strain wave gearing, the externally toothed gear has a cupped shape; therefore, a preload acts on the opening side in the tooth width direction in the teeth engagement parts near the long axis, and the preload inhibits, to an extent, generation of engagement backlash. In contrast, the engagement backlash in a flat-profile strain wave gearing in which no preload applies is greater than that in a cup-profile strain wave gearing.

Patent Document 1 proposes a reduction gear in which backlash can be reduced. In this reduction gear, elastically deformable external teeth are incorporated and caused to engage with internal teeth in a preloaded state, whereby backlash is reduced.

PRIOR ART DOCUMENT

Patent Document

Patent Document 1: JP-A 2012-219908

SUMMARY OF THE INVENTION

Problems to be Solved by the Invention

A possible solution is to use the elastically deformable external teeth set out in Patent Document 1 in the strain wave gearing in which underlapping engagement is formed to eliminate the tooth engagement backlash. However, the engagement backlash cannot be eliminated unless the external teeth are engaged with the internal teeth in a state of being preloaded or subjected to a load and caused to elastically deform. For example, during a no-load operation, the external teeth do not elastically deform, and it is therefore not possible to eliminate engagement backlash.

An object of the present invention is to provide a strain wave gearing in which elastically deformable external teeth are used to minimize or eliminate tooth engagement backlash, even in the absence of preload or load.

Another object of the present invention is to provide a strain wave gearing in which elastically deformable external teeth are used to minimize or eliminate tooth engagement backlash without involving problems such as a rapid increase in startup torque or tooth surface load or a difficulty of assembly.

Means to Solve the Problems

In order to solve the above problem, a strain wave gearing according to the present invention is characterized in that external teeth of a flexible externally toothed gear are elastically deformable in a direction in which the tooth thickness of the external teeth increases and decreases, internal teeth of a rigid internally toothed gear and the external teeth engage in an overlapping state in which the external teeth elastically deform and engage in a state in which no gap is present, and the internal teeth have a tooth profile which is corrected so that no interference occurs between a tooth top portion of the internal teeth and a dedendum portion of the external teeth when the teeth are engaged in an overlapping state.

In the present invention, the elastically deformable external teeth engage with the internal teeth in an overlapping state. In other words, the internal teeth profile or the external teeth profile functions as a shifted tooth profile shifted in the positive direction so as to set the engagement between the teeth to an overlapping state. It may also be possible to instead set the amount of deflection of the externally toothed gear by the wave generator to an amount greater than a standard deflection amount at which the overlap amount is zero. When the external teeth and the internal teeth are engaged in an overlapping state, the external teeth can elastically deform in the direction in which the tooth thickness of the external teeth increases and decreases; therefore, the external teeth move along the tooth surface of the internal teeth while elastically deforming.

Accordingly, it is possible to minimize or eliminate backlash when the teeth engage, even in a state in which there is no preload or load. In addition, the elastic deformation of the external teeth prevents a rapid increase in the startup torque or the like even when the teeth are engaged in an overlapping state, eliminating any difficulty of assembly. The dedendum portion linked to the root rim in the elastically deformable external teeth does not essentially elastically deform in the tooth thickness direction, risking interference with the tooth top portion of the internal teeth. Since the tooth profile of the internal teeth is corrected so that these portions do not interfere, it is possible to form a smooth engagement between the teeth.

In the present invention, the engagement between the internal teeth and the external teeth in an overlapping state is preferably formed by shifting the tooth profile of the internal teeth or the external teeth.

If the engagement in an overlapping state is formed by increasing the amount of deflection of the externally toothed gear, it is necessary to reduce the effective tooth depth in order to avoid an engagement interference. As a result, the load torque capacity of the strain wave gearing is reduced. Accordingly, it is preferable to form an engagement in an overlapping state by shifting the external teeth or the internal teeth, and correct the tooth profile of the internal teeth so that no interference occurs between the tooth top portion of the internal teeth and the dedendum portion of the external teeth when the teeth are engaged in an overlapping state.

In the present invention, the external teeth are formed so that the amount of elastic deformation gradually decreases from the tooth top towards the dedendum of the external teeth. The external teeth thereby elastically deform significantly in the tooth thickness direction on the tooth top side, but the elastic deformation is negligible on the dedendum side.

For example, a slotted groove is formed on the external teeth, the slotted groove extending, when viewed from the tooth width direction, from the dedendum side to the tooth top side with a tooth crest center line as the center line, and opening on a top land. In this case, the width of the slotted groove is preferably 15% to 40% of the tooth thickness of the external teeth. The maximum depth of the slotted groove is preferably the depth to the root circle of the externally toothed gear. Furthermore, the groove bottom surface of the slotted groove is preferably defined by an arcuate concave surface. The groove width of the slotted groove can be made uniform from the groove bottom surface to the top land. The groove width of the slotted groove may instead gradually increase from the groove bottom surface to the top land.

In the present invention, the shape of the tooth surface portion involved in engagement in the corrected tooth profile employed as the internal teeth tooth profile can be set as follows. Specifically: the tooth profile of internal teeth capable of engaging with the external teeth in a non-overlapping state is taken as the basic tooth profile, the overlap amount when the external teeth and the internal teeth are engaged is taken as the set overlap amount, the tooth profile obtained by moving the basic tooth profile to a position set apart from the basic tooth profile by half of the set overlap amount along the tooth crest center line in a direction towards the external teeth is taken to be the parallel movement tooth profile; and a curve obtained by rotating a portion of a tooth surface tooth profile curve defining the tooth surface involved in engagement of the basic tooth profile, to a position at which contact is made with a dedendum-side end of the parallel movement tooth profile, about a tooth top-side end of the tooth surface tooth profile curve, is taken to be the rotated tooth surface tooth profile curve. An effective engagement tooth profile surface involved in engagement in the corrected tooth profile is defined by the rotated tooth surface tooth profile curve.

The present invention can be applied to a flat-profile strain wave gearing provided with a cylindrical externally toothed gear in which no preload is applied. The present invention can also be applied to other strain wave gearings such as cup-profile or top-hat-profile strain wave gearings.

MODE FOR CARRYING OUT THE INVENTION

An embodiment of a strain wave gearing in which the present invention is applied will now be described with reference to the accompanying drawings.

Figure 1:
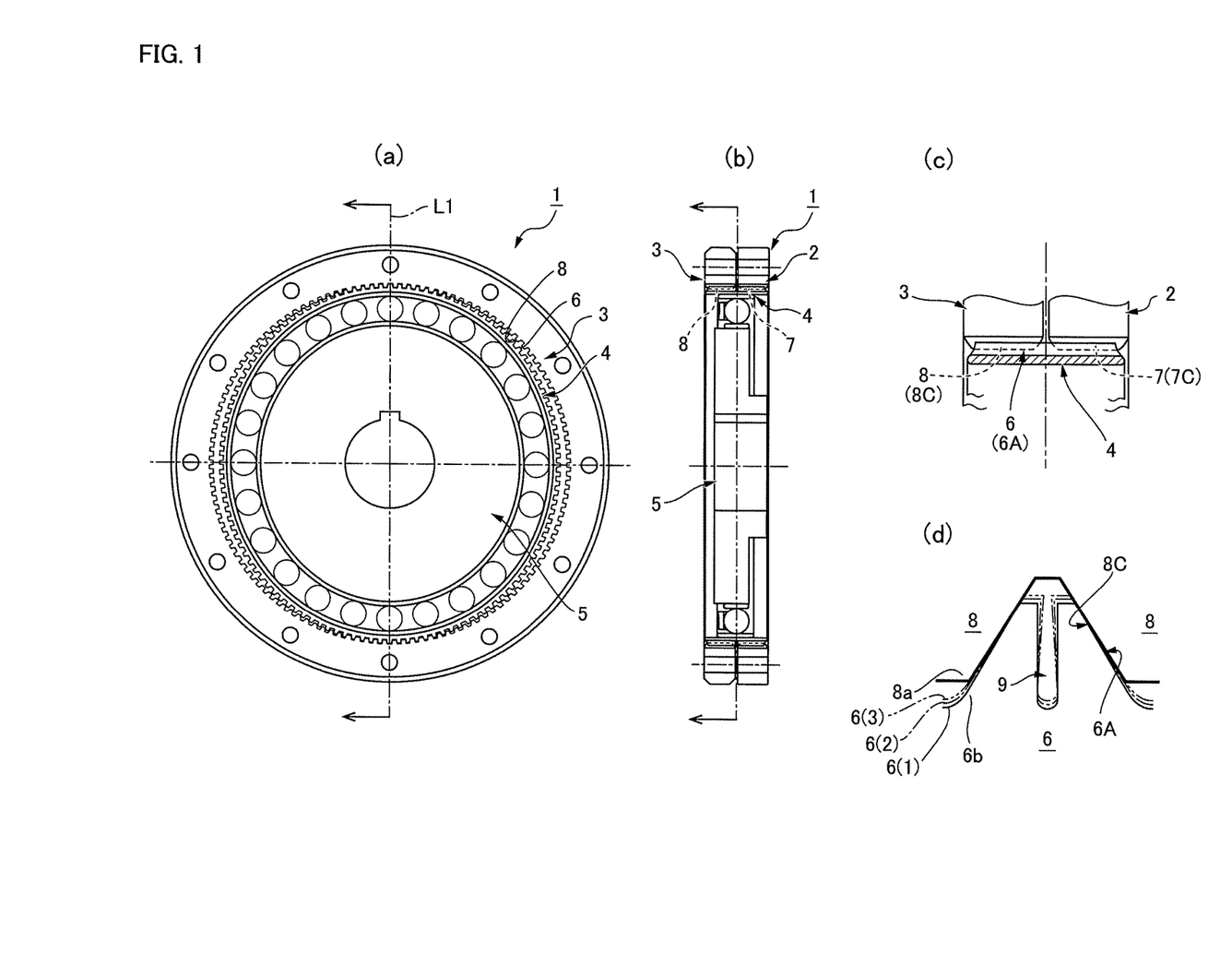
FIG. 1 includes a schematic transverse cross-section view, a schematic vertical cross-section view, a partial enlarged cross-section view, and a schematic diagram illustrating a state in which teeth are engaged, of a flat-profile strain wave gearing in which the present invention is applied.

FIG. 1(a) is a schematic transverse cross-section view illustrating a flat-profile strain wave gearing according to the embodiment, FIG. 1(b) is a vertical cross-section view of the strain wave gearing, FIG. 1(c) is a partial enlarged cross-section view of the strain wave gearing, and FIG. 1(d) is a schematic diagram illustrating a state in which teeth are engaged at a position of the long axis of an ellipsoidal shape.

As illustrated in FIG. 1(a)-(c), the strain wave gearing 1 is provided with a first internally toothed gear 2 and a second internally toothed gear 3 as rigid internally toothed gears. The first and second internally toothed gears 2, 3 are disposed coaxially in parallel, and a flexible externally toothed gear 4 of cylindrical shape is disposed on the inside of the first and second internally toothed gears 2, 3. A wave generator 5 having an ellipsoidal profile is fitted to the inside of the externally toothed gear 4. The wave generator 5 flexes the externally toothed gear 4 into an ellipsoidal shape, and, at both end portions of the long axis L1 of the ellipsoidal shape, external teeth 6 engage internal teeth 7 of the first internally toothed gear 2 and internal teeth 8 of the second internally toothed gear 3. For example, the number of teeth on the first internally toothed gear 2 is greater than the number of teeth on the second internally toothed gear 3 by 2n (where n is a positive integer), and the number of teeth on the externally toothed gear 4 is the same as the number of teeth on the second internally toothed gear 3.

At positions on the long axis L1 of the ellipsoidal shape of the externally toothed gear 4, an external tooth 6 engages with an internal tooth 8 as shown in FIG. 1(d). The external teeth 6 of the externally toothed gear 4 have a slotted groove 9 formed thereon, and are capable of elastically deforming in the direction in which the tooth thickness of the external teeth 6 increases and decreases. The engagement between the external teeth 6 and the internal teeth 7, 8 of the first and second internally toothed gears 2, 3 is set so as to occur in an overlapping state. In FIG. 1(a), the slotted grooves 9 are omitted in the illustration of the external teeth 6.

For example, as an external tooth 6 moves to a position of deepest engagement (position on the long axis L1), the external tooth 6 moves along the tooth surface of an internal tooth 8 in a state in which no gap is present, while elastically deforming in the direction in which the tooth thickness decreases, as shown by a solid line 6(1), a one-dot chain line 6(2), and a two-dot chain line 6(3) in FIG. 1(d). Furthermore, as described further below, corrected tooth profiles 7C, 8C obtained by correcting a basic tooth profile capable of engaging with the tooth profile 6A of the external teeth 6 are employed as the tooth profiles of the internal teeth 7, 8. Using the corrected tooth profiles 7C, 8C produces an engagement between the external teeth 6 and the internal teeth 7, 8 in an overlapping state, and prevents interference between the tooth top portion of the internal teeth 7, 8 and the dedendum portion of the external teeth 6 when the teeth are engaged. A description will now be given for an external tooth 6 and one of the internal teeth 8.

Figure 2:
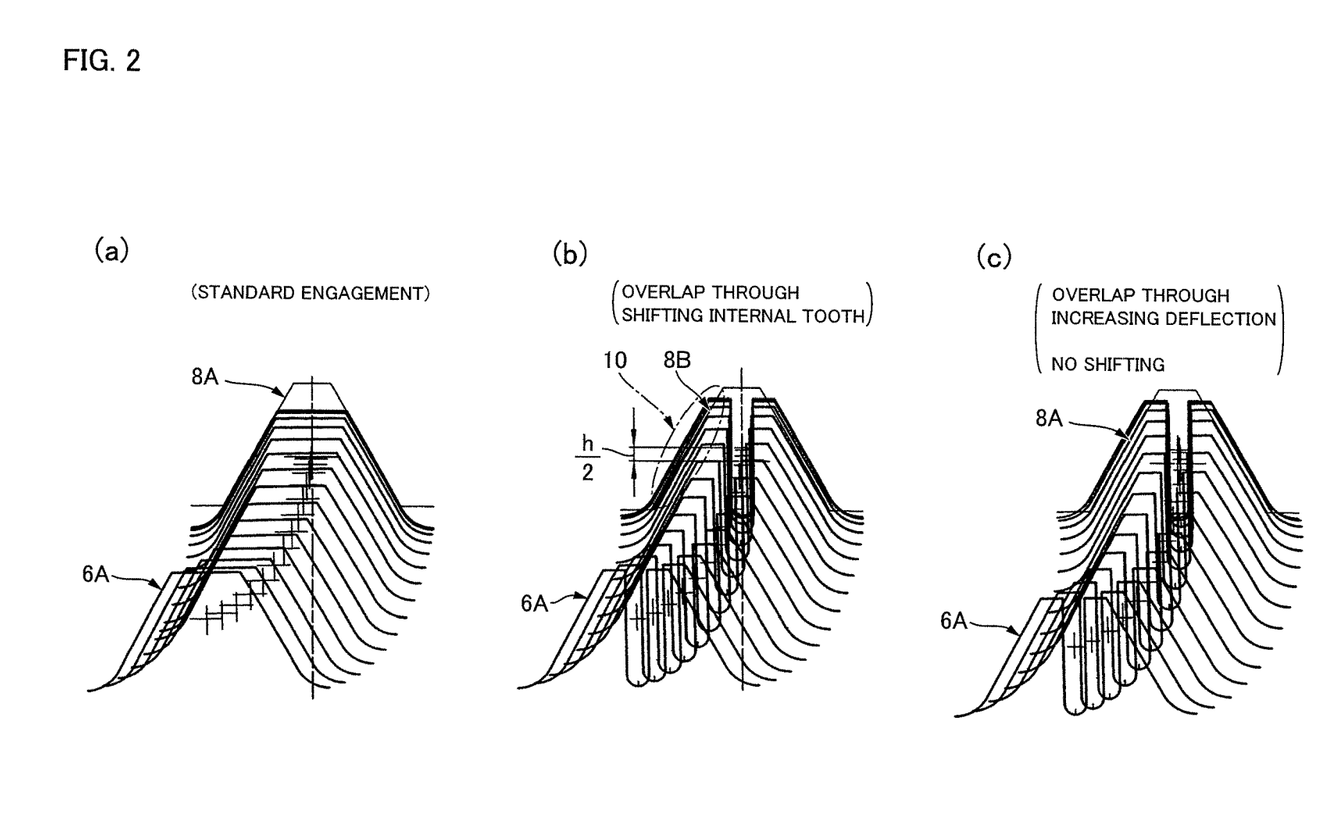
FIG. 2 includes a schematic diagram illustrating a state in which external teeth and internal teeth provided with a standard tooth profile are engaged, and schematic diagrams illustrating two examples of a state in which teeth are engaged in an overlapping state.

FIG. 2(a) is a schematic diagram illustrating a standard engagement between the two teeth 6, 8, and FIGS. 2(b) and (c) are schematic diagrams illustrating engagement between the two teeth 6, 8 in an overlapping state.

In an engaged state in which the lap amount is zero, in which the engagement pitch circle diameters (PCDs) of the two gears 3, 4 match, the internal tooth 8 and the external tooth 6 engage gaplessly at the position of deepest engagement of the internal tooth 8 with the external tooth 6. Normally, as illustrated in FIG. 2(*a*), the two gears 3, 4 engage in an underlap state in which a slight gap is formed. The tooth profile (basic tooth profile) 8A of the internal tooth 8 and the tooth profile 6A of the external tooth 6 engage without interference.

In order to form an engagement between the internal teeth 8 and the external teeth 6 in an overlapping state, a shifted tooth profile 8B, in which the basic tooth profile 8A is shifted in the positive direction in correspondence with the overlap amount h, is used as the tooth profile of the internal teeth 8. As illustrated in FIG. 2(*b*), the deepest position of engagement of the tooth profile 6A of the external tooth 6 is nearer the side of the root of the internal teeth 8. A shifted tooth profile may also be used as the tooth profile of the external teeth 6, instead of that of the internal teeth 8, in order to form an engagement between the two teeth 6, 8 in an overlapping state.

In an engagement in an overlapping state, the tooth profile 6A of the external tooth 6 interferes with the shifted tooth profile 8B of the internal tooth 8, in accordance with the overlap amount, from a position on the nearside of the deepest position. The portion enclosed by the one-dot chain line represents an interference region 10. As a result, adverse effects such as a rapid increase in the startup torque of the strain wave gearing 1 or an increased difficulty in assembling both gears together are produced.

As illustrated in FIG. 2(*c*), the amount of deflection of the externally toothed gear 4 by the wave generator 5 may be set to be greater than the deflection amount at which the standard engagement illustrated in FIG. 2(*a*) is obtained to form an engagement in an overlapping state. In this case, interference occurs between the tooth profile 6A, 8A of the two teeth 6, 8 as with the case in FIG. 2(*b*). As a result, adverse effects such as a rapid increase in the startup torque of the strain wave gearing 1 or an increased difficulty in assembling both gears together are produced.

In the present example, teeth capable of elastically deforming in the tooth thickness direction are used as the external teeth 6 so that the tooth profile 6A of the external teeth 6 can smoothly move in a gapless state along the tooth surface of the tooth profile, e.g., the shifted tooth profile 8B, of the internal teeth 8.

Figure 3:
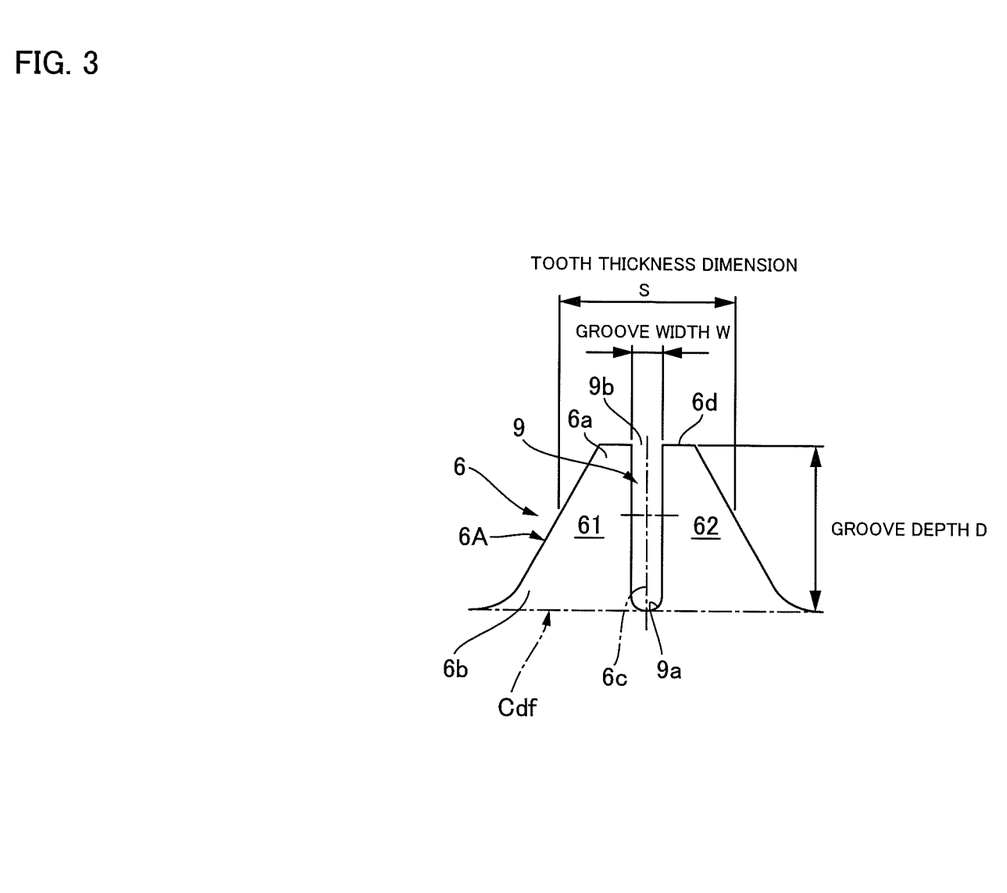
FIG. 3 is a schematic diagram illustrating an elastically deformable external tooth.

FIG. 3 is a schematic diagram illustrating an elastically deformable external tooth 6. The external tooth 6 is capable of elastically deforming in the direction in which the tooth thickness of the external tooth 6 decreases (i.e., the circumferential direction) when the teeth engage in an overlapping state. In the present example, the external teeth 6 are structured so that the amount of elastic deformation is greater at a tooth top part 6*a* thereof, and decreases towards a dedendum part 6*b*. In order to produce this, in the present example, the slotted groove 9 is formed in the external teeth 6.

More specifically, a slotted groove 9 extending, when viewed from the tooth width direction, from the dedendum side to the tooth top side with a tooth crest center line 6*c* as the center line, and opening on a top land 6*d*, is formed on the external teeth 6. The slotted groove 9 separates an external tooth 6 from the dedendum side into left and right external tooth portions 61, 62. The external tooth portions 61, 62 are capable of elastically deforming, when engaging with an internal tooth 8, in the direction in which tooth top-side portions move nearer each other in the tooth thickness direction (circumferential direction), in accordance with the overlap amount. Accordingly, when the external tooth 6 engages with the internal tooth 8, the external tooth portions 61, 62 on the engagement side move along the tooth surface of the internal tooth 8 while being pressed and caused to elastically deform by the tooth surface of the internal tooth 8.

The slotted groove 9 is preferably of a groove shape in which variables such as the spring constant and the tooth surface contact force due to the load torque can be set to appropriate values on the basis of the relationship between the deformation force and the amount of elastic deformation from the dedendum to the tooth top of the external tooth 6. Elastic deformation of the external tooth 6 can be more readily produced when the groove width W is larger. However, if the groove width W is too large, the spring constant and the ratcheting torque would significantly decrease. From such a viewpoint, the groove width W of the slotted groove 9 is preferably 15 to 40% of the tooth thickness S of the external tooth 6.

Specifically, a groove width W exceeding 40% of the tooth thickness S is unfavorable due to a resulting significant decrease in the spring constant and the ratcheting torque. A groove width W under 15% of the tooth thickness S is also unfavorable due to an increase in the elastic deformation force associated with the external teeth 6, resulting in an increase in startup torque and a decrease in efficiency.

The groove width W is overall uniform, but, may gradually increase from a groove bottom surface 9*a* of the slotted groove 9 to a groove opening part 9*b* which opens on the top land 6*d* of the external tooth 6.

The groove depth D of the slotted groove 9 is preferably no greater than that at which a root circle Cdf of the externally toothed gear 4 is reached, in order to prevent a decrease in the fatigue strength of the externally toothed gear 4. The groove bottom surface 9*a* is preferably an arcuate concave surface in order to mitigate external teeth stress concentration. In the present example, the groove depth D of the slotted groove 9 corresponds to that at which the root circle Cdf of the externally toothed gear is reached. The groove depth D can also be made smaller than the above. The groove bottom surface 9*a* of the slotted groove 9 is defined by a semicircular concave surface.

Figure 4:
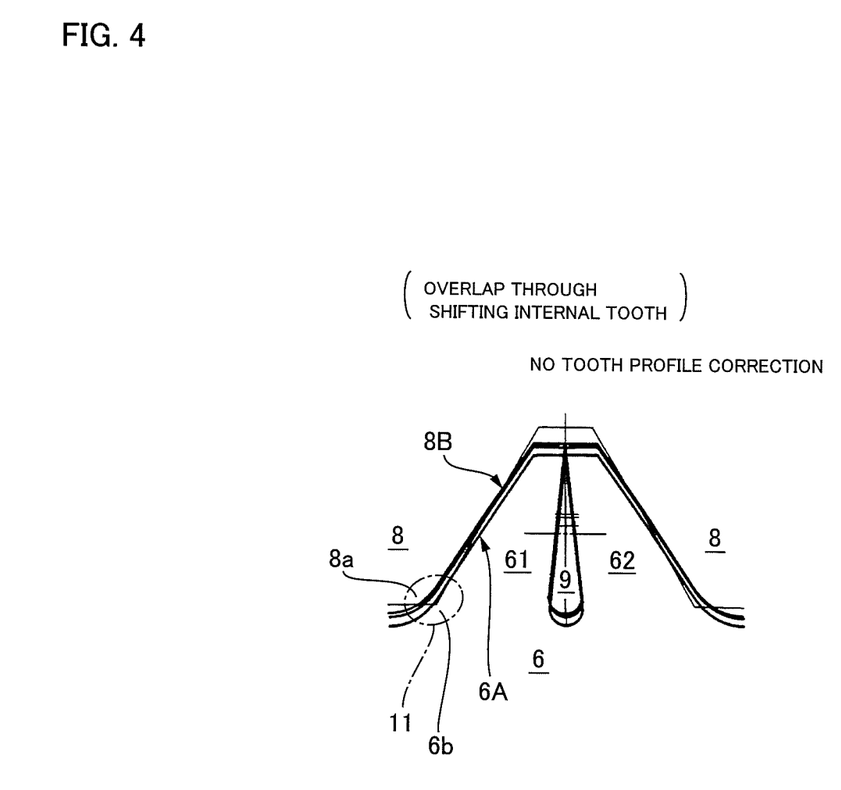
FIG. 4 is a schematic diagram illustrating interference between the dedendum part of an external tooth and the tooth top part of an internal tooth.

Next, by using elastically deformable external teeth 6, it is possible to move the tooth profile 6A of the external tooth 6 in a gapless state along the tooth surface of the shifted tooth profile 8B of the internal tooth 8 when the teeth are engaged in an overlapping state. However, even when elastically deformable external teeth 6 are used, as shown in FIG. 4, if the teeth are engaged in an overlapping state, it is not possible to eliminate the interference produced between the dedendum part 6*b* of the external tooth 6 and a tooth top part 8*a* of the internal tooth 8 at, or around, the deepest engagement position of the external tooth 6. In FIG. 4, an interference region 11 is surrounded by a one-dot chain line.

In the internal teeth 8 of the present example, a corrected tooth profile 8C obtained by applying a tooth profile correction on the shifted tooth profile 8B is used as the tooth profile of the internal teeth 8 in order to eliminate such interference when the teeth engage.

Figure 5:
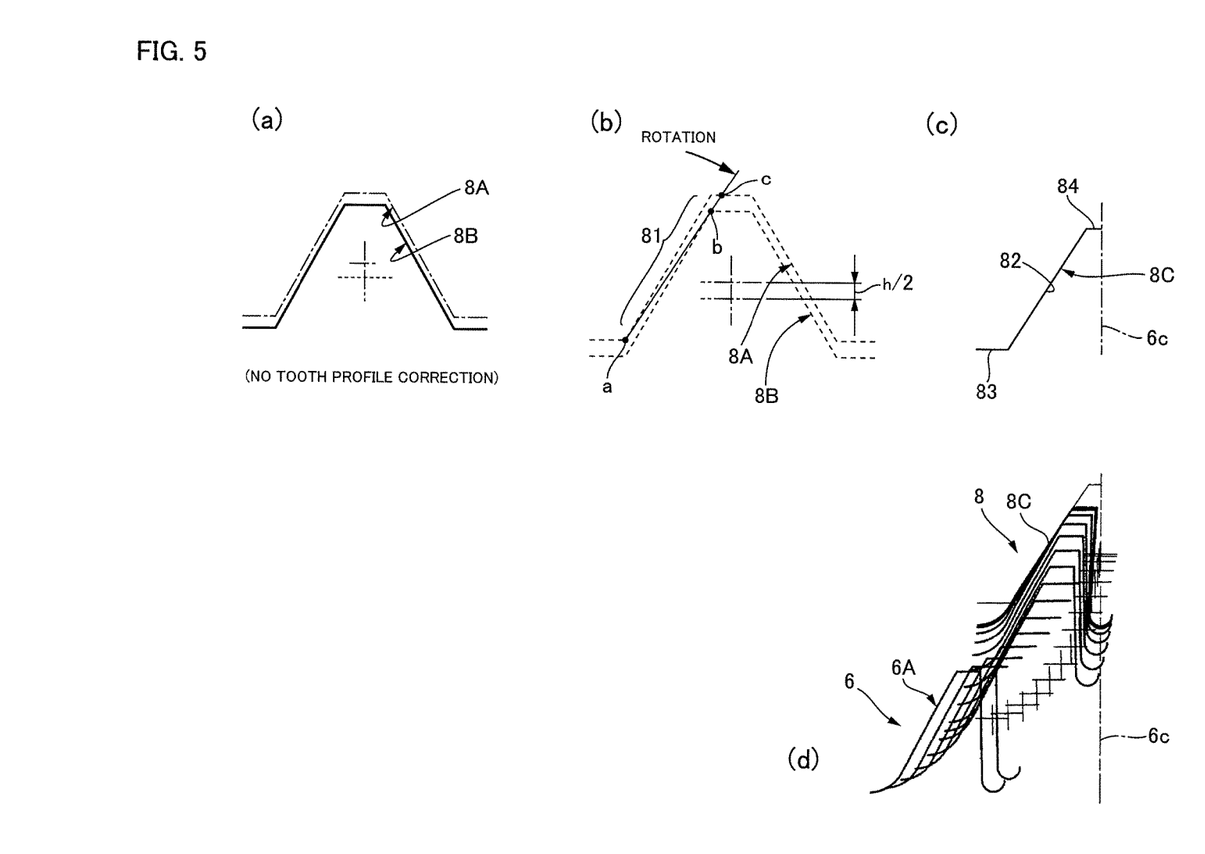
FIG. 5 includes a schematic diagram illustrating a shifted tooth profile of an internal tooth, a schematic diagram illustrating a method for tooth profile correction, a schematic diagram illustrating an example of a corrected tooth profile, and a schematic diagram illustrating a state in which a tooth profile of external teeth and a corrected tooth profile of internal teeth are engaged.

FIG. 5(*a*) is a schematic diagram illustrating the shifted tooth profile 8B of the internal tooth 8, FIG. 5(*b*) is a schematic diagram illustrating a tooth profile correction method, FIG. 5(*c*) is a schematic diagram illustrating the corrected tooth profile 8C, and FIG. 5(d) is a schematic diagram showing a state of engagement between the corrected tooth profile 8C and the tooth profile 6A of the external tooth 6.

First, the tooth profile 6A of the external teeth 6 and the basic tooth profile 8A of the internal teeth 8 are designed, and a design overlap accounting for the elastic deformation of the external teeth 6 is set. As illustrated in FIG. 5(a), a parallel movement tooth profile (shifted tooth profile) 8B of the basic tooth profile 8A of the internal tooth 8 is drawn at a position set away from the basic tooth profile 8A by half of the overlap amount h along the tooth crest center line in a direction towards the tooth profile 6A of the external tooth 6.

Next, a portion of a tooth surface tooth profile curve 81 defining a tooth surface involved in engagement of the basic tooth profile 8A is rotated, as shown in FIG. 5(b), to a position at which contact is made with a dedendum-side end point b of the parallel movement tooth profile 8B, about a tooth top-side end point a of the tooth surface tooth profile curve 81. The rotated tooth surface tooth profile curve obtained after the rotation is smoothly extended until the curve intersects with the top land of the basic tooth profile 8A, and the point of intersection with the top land is deemed to be an intersection point c. A tooth profile curve from the end point a to the intersection point c is used to define an effective engagement tooth profile surface 82, involved in engagement, of the corrected tooth profile 8C.

The corrected tooth profile 8C of the internal teeth 8 is, as illustrated in FIG. 5(c), defined by the corrected effective engagement tooth profile surface 82 thus obtained, and a predetermined top land 83 and a predetermined root surface 84. The top land 83 and the root surface 84 are not involved in the engagement of the teeth and therefore can be defined using an appropriate straight line or a curve capable of securing a predetermined radial clearance with respect to the tooth profile 6A of the external teeth 6.

As shown in FIG. 5(d), no interference occurs in engagement, in an overlapping state, between the internal tooth 8 provided with the corrected tooth profile 8C formed as described above and the external tooth 6 provided with the tooth profile 6A. The internal teeth 7 of the other, first internally toothed gear 2, are defined by a corrected tooth profile, as with the internal teeth 8.

As described above, in the strain wave gearing 1 of the present example, the externally toothed gear 4 is engaged with the internally toothed gears 2, 3 in an overlapping state. External teeth capable of elastically deforming in the direction in which the tooth thickness decreases are used as the external teeth 6 of the externally toothed gear 4. In addition, a corrected tooth profile 7C corrected so as to account for the elastic deformation of the external teeth 6 due to the set overlap amount is used for the internal teeth 7, 8 of the internally toothed gears 2, 3.

Accordingly, in the present example, it is possible to realize a strain wave gearing in which teeth engaging backlash can be minimized or eliminated even in the absence of preload or load. It is also possible to realize a strain wave gearing in which tooth engagement backlash can be minimized or eliminated without producing a rapid increase in the startup torque or the like or creating difficulties with assembly.

In addition, the engagement in an overlapping state is formed by applying a shift to the tooth profile of the internal teeth. In a case in which the engagement in an overlapping state is formed by increasing the amount of deflection of the externally toothed gear by the wave generator, it is necessary to reduce the effective tooth depth of the tooth profile of the external teeth in order to avoid teeth engagement interference. This may be unfavorable, as the load torque capacity of the strain wave gearing may decrease as a result. The present example is favorable because an engagement in an overlapping state is formed by applying a shift to the tooth profile, making it possible to avoid engagement interference without reducing the effective tooth depth of the tooth profile of the external teeth.

The invention claimed is:

1. A strain wave gearing having a rigid internally toothed gear and a flexible externally toothed gear, wherein
   the flexible externally toothed gear has external teeth that are elastically deformable in a direction in which a tooth thickness of the external teeth increases and decreases;
   internal teeth of a rigid internally toothed gear and the external teeth engage in an overlapping state in which the external teeth elastically deform and engage in a state in which no gap is present;
   the internal teeth have a corrected tooth profile that is corrected so that no interference occurs between a tooth top portion of the internal teeth and a dedendum portion of the external teeth when the teeth are engaged in the overlapping state;
   an effective engagement tooth profile surface of the corrected tooth profile involved in engagement with the external teeth is defined by a rotated tooth surface tooth profile curve;
   a tooth profile of the internal teeth capable of engaging with the external teeth in a non-overlapping state is taken as a basic tooth profile;
   an overlap amount when the external teeth and the internal teeth are engaged in the overlapping state is taken as a set overlap amount;
   a tooth profile obtained by moving the basic tooth profile to a position set apart from the basic tooth profile by half of the set overlap amount along a tooth crest center line in a direction towards the external teeth is taken to be a parallel movement tooth profile; and
   the rotated tooth surface profile curve is defined by a curve that is obtained by rotating a portion of a tooth surface tooth profile curve defining a tooth surface of the basic tooth profile involved in engagement with the external teeth, to a position at which contact is made with a dedendum-side end of the parallel movement tooth profile, about a tooth top-side end of the tooth surface tooth profile curve.

2. The strain wave gearing according to claim 1, wherein the external teeth are formed so that an amount of elastic deformation gradually decreases from a tooth top towards a dedendum of the external teeth.

3. The strain wave gearing according to claim 2, wherein a slotted groove is formed on the external teeth, the slotted groove extending, when viewed from a tooth width direction, from the dedendum side to the tooth top side with the tooth crest center line as a center line, and opening on a top land.

4. The strain wave gearing according to claim 3, wherein a groove width of the slotted groove is 15% to 40% of the tooth thickness of the external teeth, and wherein the groove width is made uniform, or is gradually increased from a groove bottom surface to the top land.

5. The strain wave gearing according to claim 3, wherein a maximum depth of the slotted groove is a depth to a root circle of the externally toothed gear.

6. The strain wave gearing according to claim 3, wherein a groove bottom surface of the slotted groove is defined by an arcuate concave surface.

7. The strain wave gearing according to claim 1, wherein a slotted groove is formed on the external teeth, the slotted groove extending, when viewed from a tooth width direction, from a dedendum side to a tooth top side with a tooth crest center line as a center line, and opening on a top land;

a groove width of the slotted groove is 15% to 40% of a tooth thickness of the external teeth;

a maximum depth of the slotted groove is a depth to a root circle of the externally toothed gear; and a groove bottom surface of the slotted groove is defined by an arcuate concave surface.

8. The strain wave gearing according to claim 1, wherein a first internally toothed gear and a second internally toothed gear disposed in parallel are provided for the internally toothed gear; and the externally toothed gear has the external teeth capable of engaging with both internal teeth of the first and second internally toothed gears, and a cylindrical body which is formed on an outer peripheral surface with the external teeth and which is capable of flexing in a radial direction.

* * * * *